United States Patent
Park et al.

(10) Patent No.: US 9,467,640 B2
(45) Date of Patent: Oct. 11, 2016

(54) IMAGE DISPLAY DEVICE AND IMAGE DISPLAY SYSTEM

(71) Applicant: LG Electronics Inc., Seoul (KR)

(72) Inventors: Hyuntaek Park, Seoul (KR);
Myeongwon Kim Kim, Seoul (KR);
Myunghoon Tak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/539,848

(22) Filed: Nov. 12, 2014

(65) Prior Publication Data
US 2015/0172585 A1    Jun. 18, 2015

(30) Foreign Application Priority Data
Dec. 16, 2013  (KR) .................. 10-2013-0156707

(51) Int. Cl.
*H04N 5/63* (2006.01)
*H04N 5/44* (2011.01)
*H04N 21/443* (2011.01)
*H04N 21/478* (2011.01)
*H04N 5/445* (2011.01)
*H04N 21/436* (2011.01)

(52) U.S. Cl.
CPC .............. *H04N 5/4403* (2013.01); *H04N 5/63* (2013.01); *H04N 21/4436* (2013.01); *H04N 21/478* (2013.01); *H04N 5/44582* (2013.01); *H04N 21/43615* (2013.01); *H04N 2005/4428* (2013.01)

(58) Field of Classification Search
CPC ............ G06F 1/266; H02J 2007/0062; H02J 7/0031; H02J 7/02; H04N 21/4426; H04N 21/44227; H04N 5/63
See application file for complete search history.

(56) References Cited

U.S. PATENT DOCUMENTS

| | | | |
|---|---|---|---|
| 2006/0035527 A1* | 2/2006 | Numano ............... | G06F 1/3203 439/668 |
| 2006/0036885 A1* | 2/2006 | Hsieh .................... | G06F 1/1601 713/300 |
| 2007/0060054 A1* | 3/2007 | Romesburg ......... | H04M 1/6041 455/41.2 |
| 2007/0142002 A1* | 6/2007 | Rofougaran ...... | H04W 72/1215 455/114.2 |
| 2007/0159348 A1* | 7/2007 | Kang .................... | G08C 17/00 340/539.3 |
| 2008/0002350 A1* | 1/2008 | Farrugia ............... | G06F 1/1632 361/679.43 |
| 2008/0030935 A1* | 2/2008 | Chu ....................... | G06F 1/1601 361/679.27 |
| 2008/0147803 A1* | 6/2008 | Krzyzanowski ...... | H04L 51/043 709/206 |
| 2009/0200982 A1* | 8/2009 | Hurtz .................... | G06F 1/3203 320/103 |
| 2010/0097030 A1* | 4/2010 | Kim ....................... | G06F 1/266 320/106 |
| 2010/0115296 A1* | 5/2010 | Inoue ..................... | G06F 1/266 713/300 |
| 2010/0161869 A1* | 6/2010 | Uchida .................. | G06F 1/266 710/313 |
| 2010/0226060 A1* | 9/2010 | Kim ....................... | H01H 3/503 361/160 |
| 2011/0246796 A1* | 10/2011 | Komori .................... | G06F 1/26 713/300 |
| 2011/0285343 A1* | 11/2011 | Weng .................... | H02J 7/0031 320/107 |

(Continued)

*Primary Examiner* — Michael Lee
(74) *Attorney, Agent, or Firm* — Birch, Stewart, Kolasch & Birch, LLP (57) ABSTRACT

An image display device including a display configured to output content, a charger configured to charge a remote controller to control the image display device, a user input interface configured to receive power on/off signals from the remote controller and a controller configured to control power use of the user input interface depending on whether the remote controller is being charged by the charger is provided.

20 Claims, 8 Drawing Sheets

(56) References Cited

U.S. PATENT DOCUMENTS

| | | | | |
|---|---|---|---|---|
| 2012/0139474 A1* | 6/2012 | Cho | G09G 3/2092 | 320/106 |
| 2012/0201062 A1* | 8/2012 | Lee | H02J 9/005 | 363/84 |
| 2012/0252475 A1* | 10/2012 | Farrell | G08G 1/205 | 455/450 |
| 2013/0007485 A1* | 1/2013 | Kim | G06F 1/26 | 713/320 |
| 2013/0057774 A1* | 3/2013 | Yoshida | H04M 1/72533 | 348/725 |
| 2013/0169612 A1* | 7/2013 | Woo | H02J 1/00 | 345/211 |
| 2014/0118620 A1* | 5/2014 | Shimizu | H04N 21/436 | 348/563 |
| 2014/0173584 A1* | 6/2014 | Gayrard | G06F 8/71 | 717/170 |
| 2015/0008876 A1* | 1/2015 | Kwak | H01F 38/14 | 320/108 |

* cited by examiner

IMAGE DISPLAY DEVICE AND IMAGE DISPLAY SYSTEM

CROSS-REFERENCE TO RELATED APPLICATION

Pursuant to 35 U.S.C. §119(a), this application claims the benefit of earlier filing date and right of priority to Korean Application No. 10-2013-0156707, filed on Dec. 16, 2013, the contents of which is incorporated by reference herein in its entirety.

BACKGROUND OF THE INVENTION

1. Field of the Invention

The present invention relates to an image display device capable of reducing power consumption.

2. Description of the Conventional Art

Image display devices include every device that receives and outputs a broadcast, or records and plays video or audio. Examples of an image display device include a television, a monitor, a projector, a tablet, etc.

As the functions of image display devices are diversified, they are being implemented in the form of a multimedia player equipped with complex functions, such as photographing and video capturing functions, gaming functions, broadcast reception functions, as well as broadcast outputting functions and video playback functions.

Meanwhile, a TV can be controlled with a remote controller. If the TV's power is off, it has to remain in standby to receive a power-on signal from a remote controller. Hence, electric power is consumed to wait for this signal.

Moreover, the more functions the remote controller has, the higher the battery consumption of the remote controller is. Also, if there are multiple TVs in one place, it is difficult to pick out one of them and pair it with the remote controller.

SUMMARY OF THE INVENTION

An aspect of the present invention is to provide an image display device capable of saving power consumed to wait for a power-on signal.

In order to accomplish this aspect of the present invention, there is provided an image display device having a display configured to output content, a charger configured to charge a remote controller to control the image display device, a user input interface configured to receive power on/off signals from the remote controller and a controller configured to control power use of the user input interface depending on whether the remote controller is being charged by the charger.

Further scope of applicability of the present application will become more apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention. In the drawings.

DETAILED DESCRIPTION OF THE INVENTION

Description will now be given in detail of the embodiments, with reference to the accompanying drawings. For the sake of brief description with reference to the drawings, the same or equivalent components may be provided with the same reference numbers, and description thereof may not be repeated. A singular expression used in the present invention includes a plural meaning unless it is obviously defined. The suffixes attached to components, such as 'module', 'unit', or 'portion' were used for facilitation of the detailed description of the present invention. Therefore, the suffixes do not have different meanings from each other.

An image display device according to an embodiment the present invention may include both a device of recording and/or reproducing images and a device for recording and/or reproducing audio by receiving and outputting broadcasts. Hereinafter, a TV as an example of the image display device will be illustrated.

Figure 1:
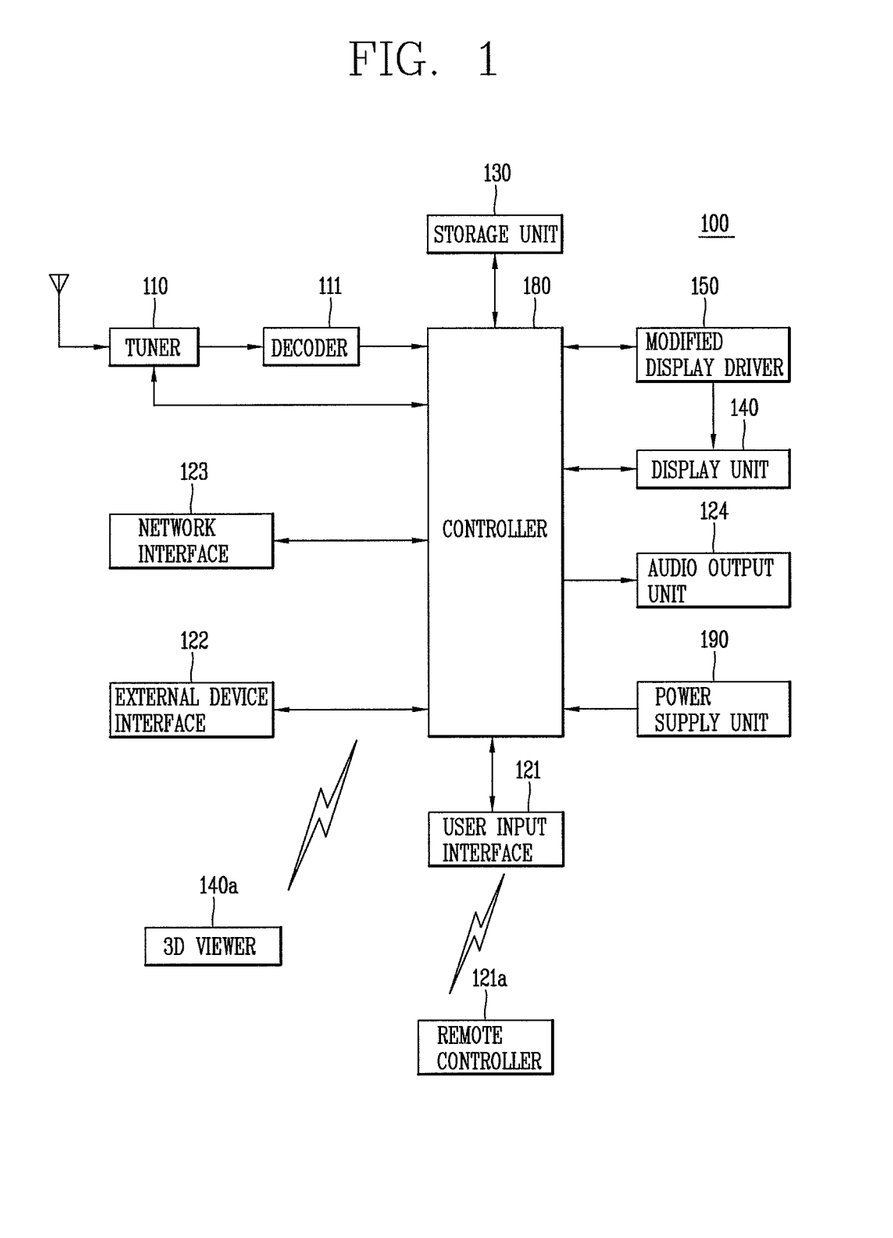
FIG. 1 is a block diagram showing an image display device according to an embodiment of the present invention and a remote controller.

FIG. 1 is a block diagram of an image display device 100 and a remote controller 121a according to an embodiment of the present invention. As illustrated in FIG. 1, the image display device 100 may include a tuner 110, a decoder 111, an external device interface 122, a network interface 123, a storage unit 130, a user input interface 121, a controller 180, a flexible display unit 140, a drive part 150, an audio output module 124, a power supply unit 190, and a 3D viewer 140a.

The tuner 110 may select a radio frequency (RF) broadcast signal, which corresponds to a channel selected by a user, among RF broadcast signals received through an antenna, or every pre-stored channel. The tuner 110 may also convert the selected RF broadcast signal into a medium frequency signal or a baseband video or audio signal.

For example, when the RF broadcast signal selected is a digital broadcast signal, the tuner 110 may convert the RF broadcast signal into a digital IF signal (DIF). Further, when the RF broadcast signal is an analog broadcast signal, the tuner 110 may convert the RF broadcast signal into an analog baseband video or audio signal (CVBS/SIF). That is, the analog baseband image or audio signal (CVBS/SIF) output from the tuner 110 may be input directly into the controller 180. Also, the tuner 110 may receive a signal carrier RF broadcast signal according to an advanced television systems committee (ATSC) standard or a multi-carrier RF broadcast signal according to a digital video broadcasting (DVB) standard. Meanwhile, the tuner 110 may sequentially select RF broadcast signals of all the broadcast channels stored through a channel memory function, of RF broadcast signals received via an antenna, and convert those RF broadcast signals into a medium frequency signal or a baseband video or audio signal.

The decoder 111 may execute a decoding operation by receiving a digital IF signal (DIF) converted in the tuner 110. For example, when the digital IF signal output from the tuner 110 is a signal according to the ATSC standard, the decoder 111 may perform 8-vestigal side band (8-VSB) demodulation. Here, the decoder 111 may also perform trellis decoding, de-interleaving, reed Solomon decoding and the like. Thus, the decoder 111 may include a trellis decoder, de-interleaver, a reed Solomon decoder and the like.

As another example, when the digital IF signal (DIF) output from the tuner 110 is a signal according to the DVB standard, the decoder 111 may perform a coded orthogonal frequency division modulation (COFDMA) demodulation. Here, the decoder 111 may also perform convolution decoding, de-interleaving, reed Solomon decoding and the like. Thus, the decoder 111 may include a convolution decoder, a de-interleaver, a reed Solomon decoder and the like.

The decoder 111 may output a stream signal after decoding and channel decoding. Here, the stream signal may be a signal in which a video signal, an audio signal and a data signal are multiplexed. As one example, the stream signal may be an MPEG-2 transport stream (TS) signal obtained by multiplexing an MPEG-2 video signal and a Dolby AC-3 audio signal. In more detail, an MPEG-2 TS signal may include a 4-byte header and a 184-byte payload.

The decoder 111 may be provided separately according to the ATSC standard and the DVB standard. That is, an ATSC decoder and a DVB decoder may be provided. The stream signal output from the decoder 111 may be input into the controller 180. The controller 180 can perform demultiplexing, video/audio signal processing and the like, output video on the flexible display unit 140 and output audio to the audio output module 124.

The external device interface 122 may connect an external device and the image display device 100 to each other. Thus, the external device interface 122 may include an A/V input/output unit or a wireless communication unit. The external device interface 122 may be connected, in a wired or wireless manner, to an external device, such as a digital versatile disk (DVD), a Blu-ray, a game machine, a camera, a camcorder, a laptop computer (notebook) and the like. The external device interface 122 may transfer a video, audio or data signal input from the exterior via the connected external device to the controller 180 of the image display device 100, and also output a video, audio or data signal processed in the controller 180 to the external device. For this, the external device interface 122 may include the A/V input/output unit or the wireless communication unit.

The A/V input/output unit may include a USB terminal, a composite video banking sync (CVBS) terminal, a component terminal, a S-video terminal (analog), a digital visual interface (DVI) terminal, a high definition multimedia interface (HDMI) terminal, an RGB terminal, a D-SUB terminal, and the like to allow video and audio signals of the external device to be input into the image display device 100.

The wireless communication unit may execute short-range wireless communication with other electronic devices. The image display device 100 may be connected to the other electronic device via a network according to communication standards, such as BLUETOOTH, radio frequency identification (RFID), infrared data association (IrDA), ultra wide-band (UWB), Zigbee and the like.

The external device interface 122 may also be connected via at least one of various set-top boxes and the aforementioned various terminals, to execute input/output operations with the set-top boxes. The external device interface 122 may execute data transmission and reception with the 3D viewer 140a.

The network interface 123 may provide an interface for connecting the image display device 100 to a wired or wireless network which includes an Internet network. The network interface 123 may include an Ethernet terminal for connection to the wired network, and use communication standards, such as wireless LAN (WLAN) (Wi-Fi), wireless broadband (Wibro), world interoperability for microwave access (Wimax), high speed downlink packet access (HSDPA) and the like for connection to the wireless network.

The network interface 123 may receive contents or data provided by a contents provider or a network operator via a network. That is, the network interface 123 may receive contents, such as a movie, an advertisement, a game, a VOD, a broadcast signal provided by the network operator, and related information via a network. The network interface 123 may also receive update information related to firmware and update files provided by the network operator. Also, the network interface 123 may transmit data to the contents provider or the network operator.

The network interface 123 may be connected to, for example, an Internet protocol (IP) TV, so as to receive a video, audio or data signal processed in an IPTV set-top box and transfer it to the controller 180 for allow bi-directional communication. The network interface 123 may also transfer signals processed in the controller 180 to the IPTV set-top box. The IPTV may indicate ADSL-TV, VDSL-TV, FTTH-TV or the like or indicate TV over DSL, Video over DSL, TV over IP (TVIP), Broadband TV (BTV) or the like, according to a type of transmission network. Also, the IPTV may indicate an Internet-accessible Internet TV, and a full-browsing TV.

The storage unit 130 may store programs for signal processing and control by the controller 180, and also store processed video, audio or data signals. The storage unit 130 may execute a function of temporarily storing a video, audio or data signal input via the external device interface 122. Also, the storage unit 130 may store information related to a predetermined broadcast channel through a channel memory function of a channel map and the like.

The storage unit 130 may include at least one storage medium of a flash memory-type storage medium, a hard disc-type storage medium, a multimedia card micro-type storage medium, a card-type memory (for example, SD or XD memory), a random access memory (RAM), a read-only memory (ROM) (e.g., electrically erasable programmable ROM (EEPROM)), and the like. The image display device 100 may reproduce a file (a video file, a still image file, a music file, a document file, etc.) stored in the storage unit 130 to provide to a user. FIG. 1 illustrates an embodiment having the storage unit 130, separate from the controller 180. However, the storage unit 130 may alternatively be configured to be included in the controller 180.

The user input interface 121 may transfer a user-input signal to the controller 180, or a signal from the controller 180 to the user. For example, the user input interface 121 may receive a user input signal, such as a power on/off, a channel selection, a screen setting and the like from the remote controller 121a, or transmit a signal from the controller to the remote controller 121a, according to various communication standards, such as RF communication, IR communication and the like.

The user input interface 121, for example, may also transfer a user input signal, which is input from a local key, such as a power key, a channel key, a volume key, or a setting key, to the controller 180, for example. Also, for example, the user input interface 121 may transfer a user input signal, which is input from a sensing unit for sensing a user's gesture, to the controller 180 or transmit a signal from the controller 180 to the sensing unit. Here, the sensing unit may include a touch sensor, a voice sensor, a position sensor, a motion sensor and the like.

The controller 180 can demultiplex stream, which is input via the tuner 110, the decoder 111 or the external device interface 122 or process the demultiplexed signals, to generate and output signals for outputting video or audio. The video signal processed in the controller 180 can be input to the flexible display unit 140 to be output as an image corresponding to the image signal. Also, the video signal processed in the controller 180 can be input to an external output device through the external device interface 122.

The audio signal processed in the controller 180 can be output to the audio output module 124. The audio signal processed in the controller 180 can be input to an external output device through the external device interface 122. Although not shown in FIG. 1, the controller 180 can include a demultiplexer, an image processor and the like.

Besides, the controller 180 can control an overall operation of the image display device 100. For example, the controller 180 can control the tuner 110 to select an RF broadcast corresponding to a user-selected channel or a pre-stored channel. The controller 180 can also control the image display device 100 by a user command input via the user input interface 121 or an internal program. For example, the controller 180 can control the tuner 110 to input a signal of a channel, which is selected in response to a predetermined channel select command received via the user input interface 121. The controller 180 can then process a video, audio or data signal of the selected channel. The controller 180 can control information related to the user-selected channel to be output through the flexible display unit 140 or the audio output module 124 together with the processed video or audio signal.

As another example, the controller 180 can control a video signal or an audio signal, which is input from an external device, for example, a camera or a camcorder through the external device interface 122 in response to an external device image reproduce command received through the user input interface 121, to be output through the flexible display unit 140 or the audio output module 124.

In the meantime, the controller 180 can control the flexible display unit 140 to display an image. For example, the controller 180 can control the flexible display unit 140 to output a broadcast image input through the tuner 110, an externally input image input through the external device interface 122, an image input through the network interface 123, or an image stored in the storage unit 130. Here, the image output on the flexible display unit 140 may be a still image or a video, and a 2D or 3D image.

The controller 180 can allow a predetermined object within the image displayed on the flexible display unit 140 to be generated and displayed as a 3D object. For example, the object may be at least one of an accessed web screen (a newspaper, a journal, etc.), an electronic program guide (EPG), various menus, a widget, an icon, a still image, a video, and text. The 3D object may be processed to have a different depth from the image displayed on the flexible display unit 140. Preferably, the 3D object may be processed to seem to protrude more than the image displayed on the flexible display unit 140.

In the meantime, the controller 180 can recognize a user's location based on an image captured by the capturing element. For example, the controller 180 can recognize a distance (z-axial coordinates) between the user and the image display device 100. Also, the controller 180 can recognize x-axial coordinates and y-axial coordinates within the image display device 100 corresponding to the user's location.

The image display device 100 may further include a channel browsing processor, which generates a thumbnail image corresponding to a channel signal or an externally input signal. The channel browsing processor may receive a stream signal output from the decoder 111 or a stream signal output from the external device interface 122, extract an image from the input stream signal, and generate a thumbnail image. The generated thumbnail image may be input to the controller 180 as it is or after being encoded. Also, the generated thumbnail image may be input to the controller 180 after being encoded into a stream format. The controller 180 can output on the flexible display unit 140 a thumbnail list including a plurality of thumbnail images using the input thumbnail image. The thumbnail list may be displayed in a briefly viewing manner in which the list is displayed on a partial region with displaying a predetermined image on the flexible display unit 140, or in a fully viewing manner in which the list is displayed on most regions of the flexible display unit 140.

The flexible display unit 140 may generate a driving signal by converting an image signal, a data signal, an OSD signal and a control signal processed in the controller 180, or an image signal, a data signal and a control signal received via the external device interface 122. One embodiment of the present invention illustrates that the flexible display unit 140 is transformable (variable) into a flat form or a curved form. When the flexible display unit 140 is transformed into the curved form like surrounding a user located in front thereof, the flexible display unit 140 may provide the user with intense quality of image and allow the user to feel more involved in an image displayed thereon. The flexible display unit 140 may be implemented by an OLED panel, for example.

The flexible display unit 140 may be configured to provide a 3D image to a user. To view the 3D image, the flexible display unit 140 may be classified into an additional displaying method and an independent displaying method. The independent displaying method may be configured such that a 3D image can be implemented only by the flexible display unit 140 without a separate 3D viewer 140a, for example, 3D glasses or the like. Various technologies such as a lenticular technology, a parallax barrier technology and the like may be applied as the independent displaying method. The additional displaying method may be configured to implement a 3D image by using the 3D viewer 140a in addition to the flexible display unit 140. As one example, various methods such as a head mount display (HMD) type, a glass type and the like may be applied. Also, the glass type may be divided into a passive glass type such as a polarized glass type and the like, and an active glass type such as a shutter glass type and the like. The HMD type may also be divided into a passive HMD type and an active HMD type. The flexible display unit 140 may be implemented as a touch screen so as to be used as an input device as well as an output device.

The drive part 150 may transform the flexible display unit 140 into a flat form or a curved form. The drive part 150 may transmit an electric signal to the flexible display unit 140 such that the flexible display unit 140 can be transformed by itself, or apply a physical force to the flexible display unit 140 directly or indirectly to transform the flexible display unit 140.

The audio output module 124 may output sound by receiving an audio signal processed in the controller 180, for example, a stereo signal, a 3.1 channel signal or a 5.1 channel signal. The audio output module 124 may be implemented into various types of speakers.

Meanwhile, to sense a user's gesture, as aforementioned, the image display device 100 may further include a sensing unit having at least one of a touch sensor, a voice sensor, a location sensor, and a motion sensor. A signal sensed by the sensing unit may be transferred to the controller 180 via the user input interface 121. The controller 180 can sense a user's gesture based on an image captured by the capturing element, a signal sensed by the sensing unit or a combination thereof.

The power supply unit 190 may supply power to every component of the image display device 100. Especially, the power supply unit 190 may supply power to the controller 180 which may be implemented in a form of a system on chip (SOC), the flexible display unit 140 to display an image, and the audio output module 124 to output an audio. Also, depending on embodiments, power may be supplied using a heat generator including a hot wire.

The remote controller 121a may transmit a user input to the user input interface 121. Thus, the remote controller 121a may use various communication standards, such as IR communication, RF communication, BLUETOOTH, ultra wideband (UWB), Zigbee and the like. Also, the remote controller 121a may receive a video, audio or data signal output from the user input interface 121, so as to display the signal on the remote controller 121a or output the signal on the remote controller 121a in form of sound.

The image display device 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display device 100 may be an IPTV digital broadcast receiver capable of receiving cable broadcast programs, satellite broadcast programs or IPTV programs.

The image display device disclosed herein may include a TV receiver, a cellular phone, a smart phone, a notebook computer, a digital broadcasting terminal, a personal digital assistant (PDA), a portable multimedia player (PMP) and the like.

The block diagram of the image display device illustrated in FIG. 1 is a block diagram of one embodiment. Each component of the block diagram may be combined, added or omitted according to the configuration of the image display device 100. That is, if necessary, two or more components may be combined into one component, or one component may be divided into two components. Also, a function performed in each block is merely illustrative, and a detailed operation or device may not limit the scope of the present invention.

Meanwhile, a TV can be controlled with a remote controller. If the TV's power is off, it has to remain in standby to receive a power-on signal from a remote controller. Hence, electric power is consumed to wait for this signal. Moreover, the more functions the remote controller has, the higher the battery consumption of the remote controller is.

Also, if there are multiple TVs in one place, it is difficult to pick out one of them and pair it with the remote controller.

Hereinafter, an image display device 100 capable of saving power consumed to wait for a power-on signal will be described with reference to the accompanying drawings. While the image display device 100 is shown as a TV, it is not so limited.

Figure 2:
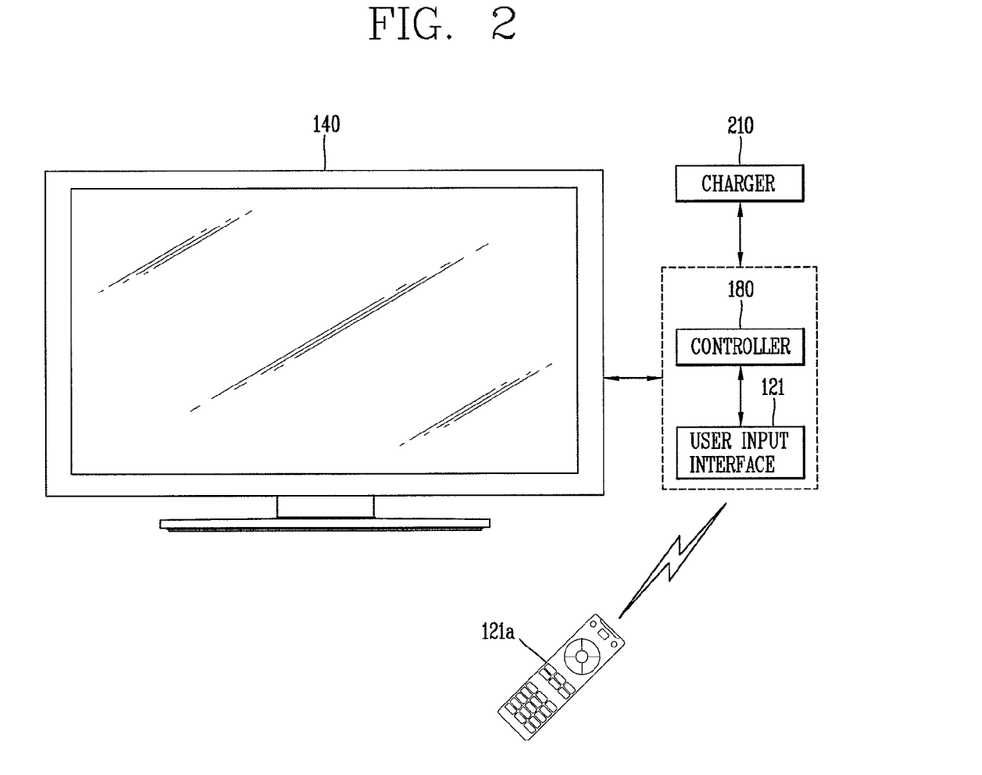
FIG. 2 is a conceptual diagram showing an image display device according to an embodiment of the present invention and one embodiment of a remote controller.

FIG. 2 is a conceptual diagram showing an image display device according to an embodiment of the present invention and one embodiment of a remote controller. Referring to FIG. 2, the image display device 100 according to an embodiment of the present invention includes a display 140, a charger 210, a user input interface 121, and a controller 180. The display 140 can output content. The content refers to videos, motion pictures, TV broadcasts, and others that can be represented by visual images.

The charger 210 can charge a remote controller 121a. For example, charging can be done by placing the remote controller 121a on a charging plate 210 or touching it on a touchpad. The charger 210 can be connected to the controller 180 via a wire, and the remote controller 121a can be implemented as various types of mobile terminals such as a remote control, a smart remote control, a smartphone, etc.

As explained above, the user input interface 121 can receive power on/off signals from the remote controller 121a. The controller 180 can control the power use of the user input interface 121 depending on whether the remote controller 121a is charged or not.

In an embodiment, if the remote controller 121a is being charged and the power is off, the controller 180 can control the power use of the user input interface 121 to receive a power-on signal. In another embodiment, if the remote controller 121a is being charged and the power is off, the controller 180 can put at least one sensor into the ON state to receive a control signal. In yet another embodiment, if the remote controller 121a is being charged, the controller 180 can pair the image display device 100 with the remote controller 121a.

Figure 3:
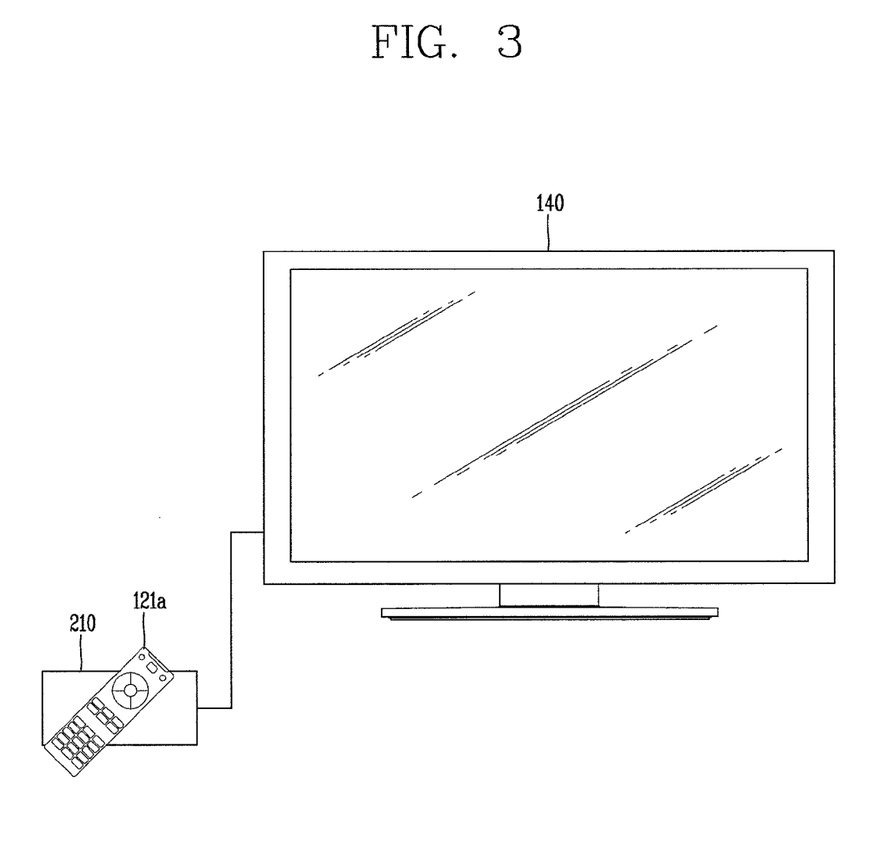
FIG. 3 is a conceptual diagram showing an embodiment of a remote controller which is being charged.

FIG. 3 is a conceptual diagram showing an embodiment of a remote controller which is being charged. Referring to FIG. 3, charging can be done by placing the remote controller 121a on the charging plate 210 or touching the remote controller 121a on a charging touchpad 210. Alternatively, the remote controller 121a can be charged in various ways such as connecting the remote controller 121a to a charger 210 and charging it. Upon completion of charging, the charger 210 may not supply electric power any longer.

In this way, if the remote controller 121a is being charged and the power of the image display device 100 is off, the I/R (infrared) standby function of the user input interface 121 for receiving a power-on signal can be turned off. Accordingly, the electric power consumed for the IR standby mode for power on can be saved.

Further, if the remote controller 121a is being charged and the power of the image display device 100 is on, a sensor 100 can be put into the ON state to receive a control signal for controlling the image display device 100. Specifically, even when the remote controller 121 is being charged, a touch sensor, an audio sensor, a location sensor, a motion recognition sensor, etc can be activated to control the image display device 100.

Also, the remote controller 121a and the image display device 100 can be paired if the remote controller 121a is being charged. Upon completion of charging, the remote controller 121a can control only the image display device 100 which is paired with it while being charged, but cannot control other TVs.

Figure 4:
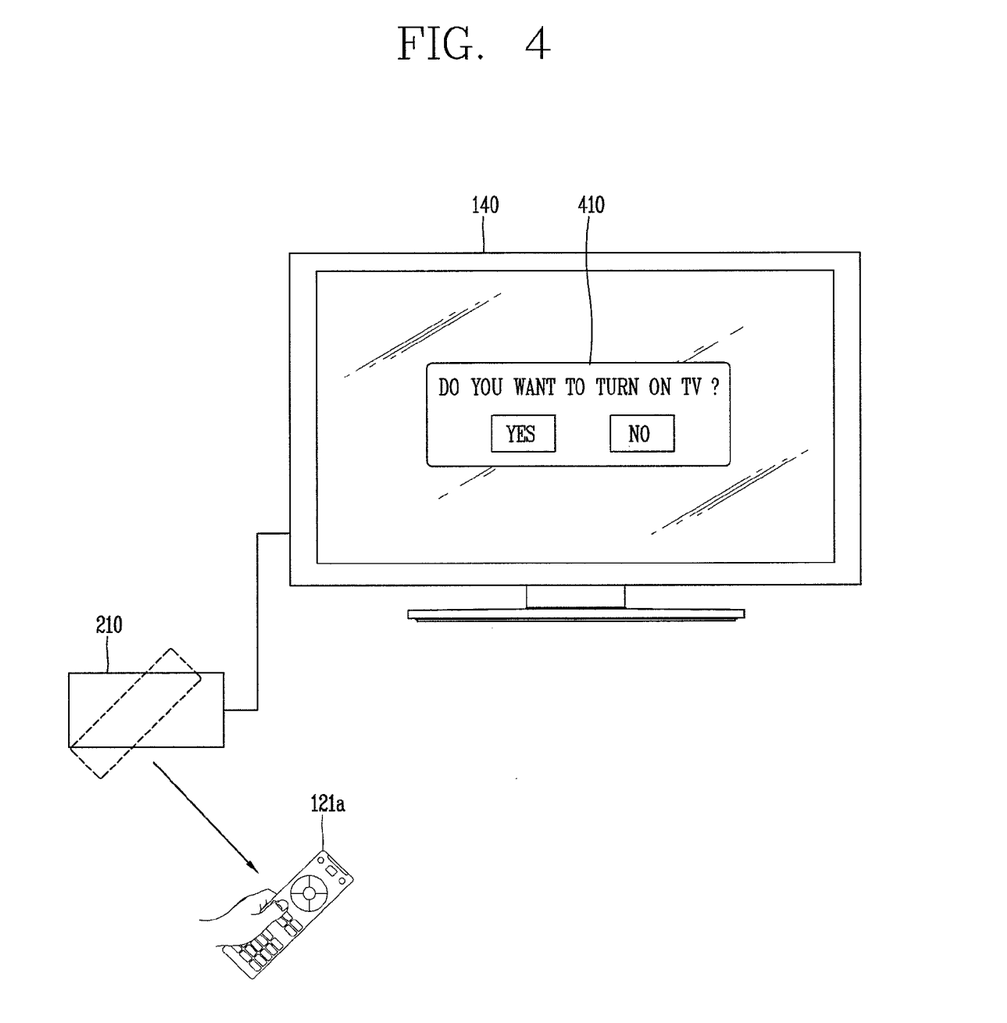
FIGS. 4 and 5 are conceptual diagrams showing embodiments related to discharging of the remote controller.
Figure 5:
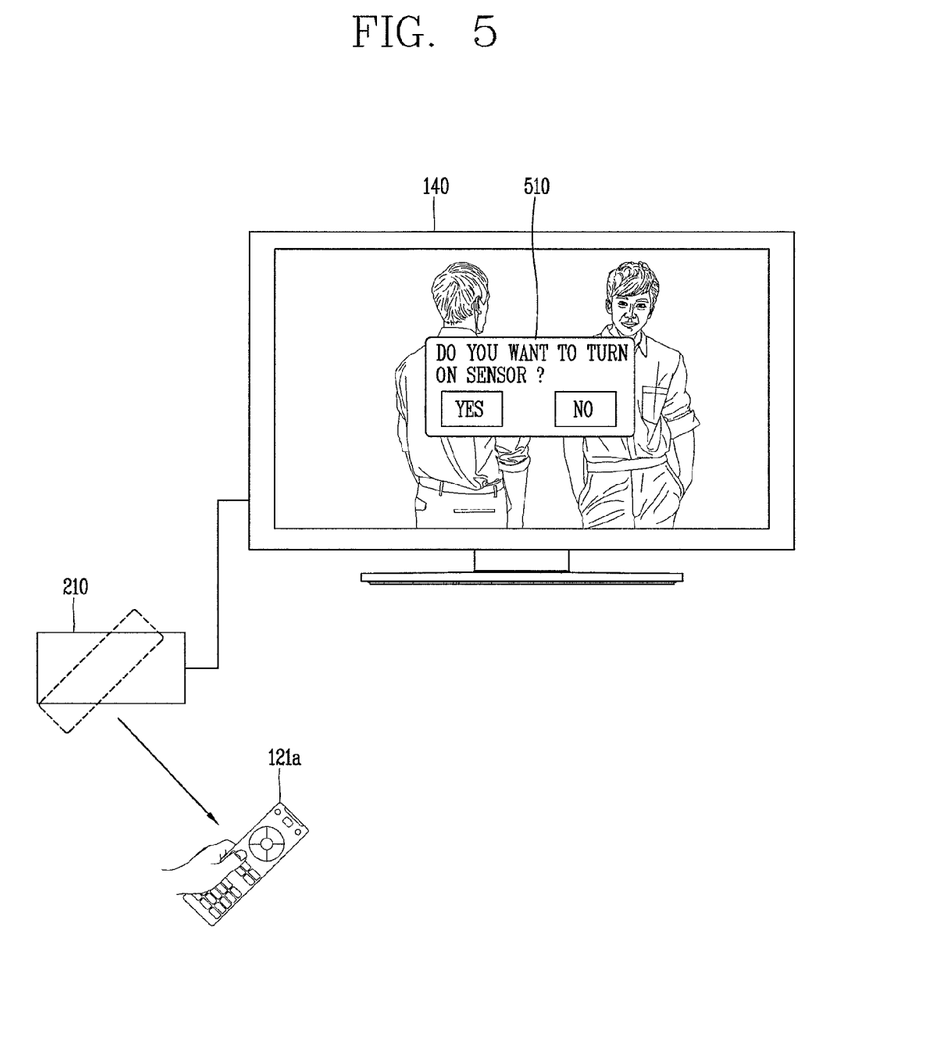

FIGS. 4 and 5 are conceptual diagrams showing embodiments related to discharging of the remote controller. Referring to FIG. 4, when the remote controller 121a is removed from the charger 210 while the power of the image display device 100 is off, the IR standby function of the user input interface 121 for receiving a power-on signal can be turned on. Moreover, a message window 410 asking whether to turn on the power of the image display device 100 can be output on the display 140 of the image display device 100 or the display of the remote controller 121a.

Referring to FIG. 5, when the remote controller 121a is removed from the charger 210 while the power of the image display device 100 is off, a message window 510 asking whether to turn on the power of the touch sensor, audio sensor, location sensor, motion recognition sensor, etc which is in operation can be output on the display 140 of the image display device 100 or the display of the remote controller 121a.

Once the remote controller 121 is removed from the charger 210, as shown in FIGS. 4 and 5, the distance between the remote controller 121a and the charger 210 can be calculated to automatically control the audio volume. In addition, the controller 180 can allow the content chosen according to the remote controller 121a paired with the image display device 100 to be output on the display 140.

Figure 6:
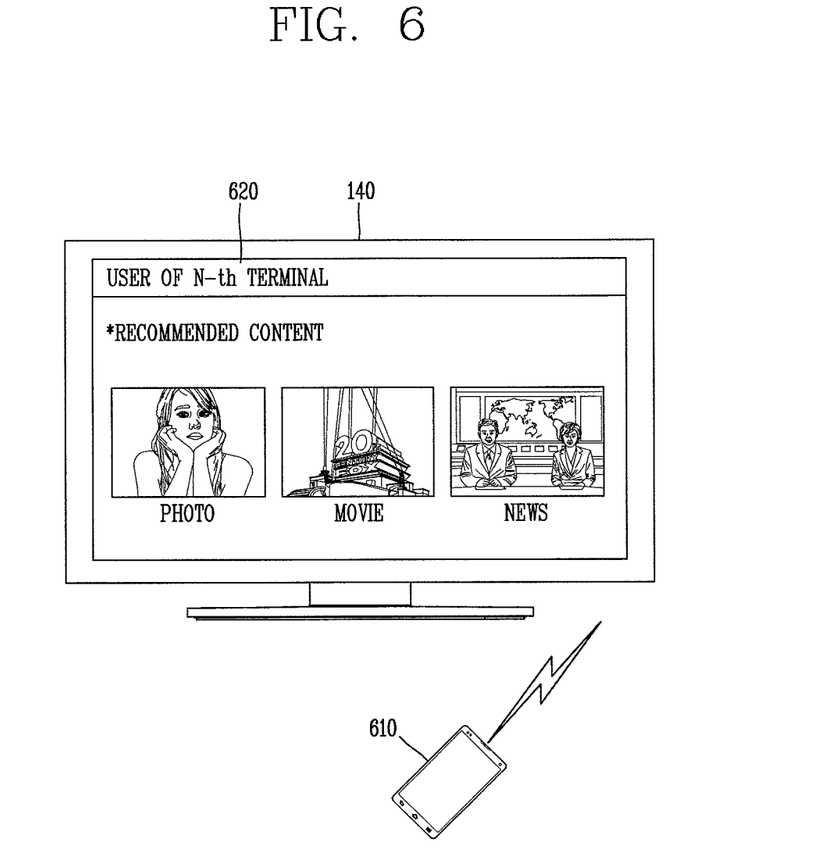
FIGS. 6 and 7 are conceptual diagrams showing embodiments for outputting content chosen according to the remote controller.
Figure 7:
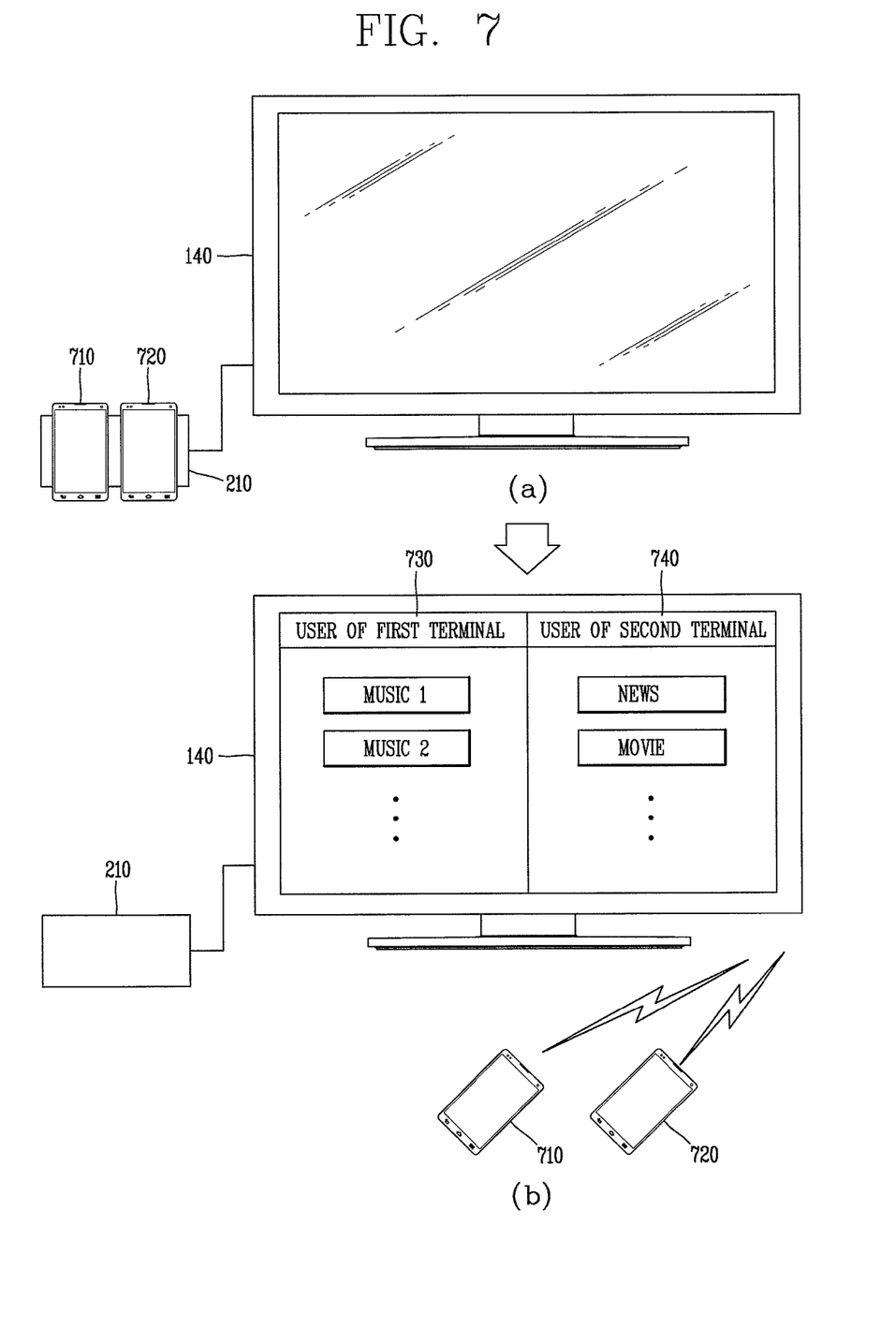

FIGS. 6 and 7 are conceptual diagrams showing embodiments for outputting content chosen according to the remote controller. Referring to FIG. 6, the remote controller 121a can be implemented as a mobile terminal 510 such as a smartphone. Also, a mobile terminal 610 paired with the image display device 100 through the charger 210 can be detected, and optimized content 620 can be output to the user of the mobile terminal 610.

For example, previous records of controlling the image display device 100 using an N-th terminal 610, that is, type of viewed content, viewing pattern, and preference or taste of the user of the N-th terminal 610 which is derived from the type of viewed content and viewing pattern can be stored in a server or memory. Afterwards, if the image display device 100 is paired with the N-th terminal 610, content 620 is chosen and output based on the previous records stored in the server or memory.

Referring to (a) of FIG. 7, simultaneous charging can be done by touching a plurality of terminals 710 and 720 on the charger 210. For example, the terminals 710 and 720 can be charged by placing them on the charging pad 210 or touching them on the charging touch pad 210. Hereupon, the terminals 710 and 720 can be paired with the image display device 100 while being charged through the charger 210.

Referring to (b) of FIG. 7, the terminals 710 and 720 are discharged if removed from the charger 210, and control signals for controlling the image display device 100 can be received from the terminals 710 and 720, respectively. That is, the two terminals 710 and 720 can control the image display device 100. In an embodiment, both content 730 preferred by the user of the first terminal 710 and content 740 preferred by the user of the second terminal 720 can be output.

When an event occurs to the remote controller 121a while the remote controller 121a is being charged, the controller 180 can allow the content corresponding to this event to be output on the display 140. In an embodiment, when an event occurs to the remote controller 121a while the remote controller 121a is being charged, the controller 180 can control the user input interface 121 to receive a control signal for the content corresponding to this event from another remote controller.

Figure 8:
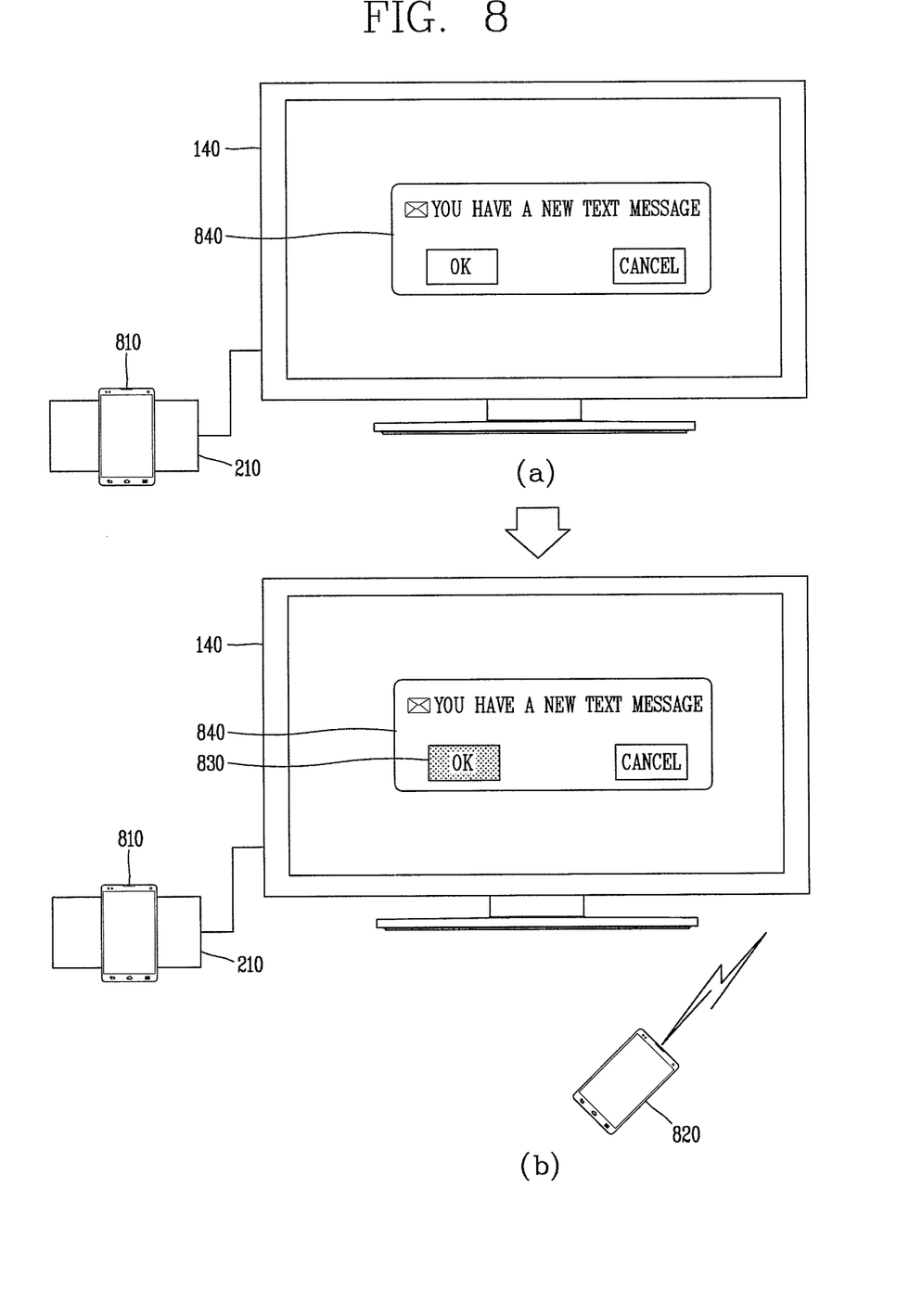
FIG. 8 is a conceptual diagram showing an embodiment for controlling an event occurring to the remote controller being charged.

FIG. 8 is a conceptual diagram showing an embodiment for controlling an event occurring to the remote controller being charged. Referring to (a) of FIG. 8, when an event occurs to a terminal 810 being charged through the charger 210, the corresponding content 840 can be output. Specifically, if the terminal 810 has an incoming text message, a message window 840 notifying the terminal 810 of the presence of the incoming text message can be output on the display 140. That is, the content corresponding to the incoming text message event refers to the content contained in the output message window 840. In another embodiment, events such as a scheduled task, alarm, incoming call, or an incoming message from SNS can occur, and a message window indicating them can be output on the display 140.

Referring to (b) of FIG. 8, a control signal for the content output on the display 140 can be received from a second terminal 820, which is a terminal other than the first terminal 810 being charged. That is, the View icon 830 for an incoming message can be selected by the second terminal 820.

In another embodiment, a message window 840 output on the display 140 of the image display device 100 can be output on the display of the second terminal 820. Accordingly, the user can select the View icon 830 for the text message on the second terminal 820 by touching it. In yet another embodiment, a scheduled task, alarm, SNS message, etc occurring to the first terminal 810 can be viewed through the second terminal 820. Also, a call made to the first terminal 810 can be answered by the second terminal 820.

According to an embodiment of the present invention, the problem of increased battery consumption of a remote controller due to the addition of functions can be solved by including a charger capable of charging the remote controller, and environmental pollution can be reduced with the use of a rechargeable battery.

Moreover, electric power consumed to wait for a power-on signal can be saved, and even if there are multiple image display devices, one of them can be correctly picked and paired with the remote controller charged through the charger. Additionally, customized content can be chosen and recommended for the charged remote controller.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An image display device comprising:
   a display configured to output content;
   a charger configured to charge a remote controller to control the image display device;

a user input interface configured to receive power on/off signals from the remote controller; and a controller configured to control power use of the user input interface depending on whether the remote controller is being charged by the charger, wherein, when the remote controller is being charged by the charger and a power to the image display device is off, the controller is configured to turn off a I/R (infrared) standby function of the user input interface for receiving a power-on signal, and when the remote controller is being charged by the charger, the controller is configured to turn on at least one sensor for receiving a control signal for controlling the image display device.

2. The image display device of claim 1, wherein, when the remote controller is being charged by the charger and power to the image display device is off, the controller is configured to control the power use of the user input interface to receive the power-on signal.

3. The image display device of claim 1, wherein, when the remote controller is being charged by the charger, the controller is configured to put at least one sensor into an ON state to be capable of receiving a control signal.

4. The image display device of claim 3, wherein, when the remote controller is not being charged by the charger while power to the image display device is off, the controller is configured to output a message window on the display requesting an input from the remote controller to switch the power to the ON state while controlling the power use of the user input interface to receive a power-on signal.

5. The image display device of claim 4, wherein, when the remote controller is removed from the charger, the controller is configured to output a message window on the display requesting an input from the remote controller to switch at least one sensor to the ON state to receive a control signal.

6. The image display device of claim 3, wherein the sensor is at least one of a touch sensor, an audio sensor, a location sensor, or a motion recognition sensor.

7. The image display device of claim 1, wherein, when the remote controller is being charged by the charger, the controller is configured to pair the image display device with the remote controller.

8. The image display device of claim 7, wherein the controller is configured to output on the display content chosen according to the remote controller paired with the image display device.

9. The image display device of claim 1, wherein, when an event occurs to the remote controller while the remote controller is being charged, the controller is configured to output on the display content corresponding to the event.

10. The image display device of claim 9, wherein, when the event occurs to the remote controller while the remote controller is being charged, the controller is configured to control the user input interface to receive a control signal for the content corresponding to the event from another remote controller.

11. The image display device of claim 1, wherein, once the remote controller is removed from the charger, the controller calculates the distance between the remote controller and the image display device and automatically controls the audio volume based on the calculated distance.

12. The image display device of claim 1, wherein, when the remote controller is a plurality of remote controllers that are being simultaneously charged, the controller is configured to pair the image display device with each remote controller of the plurality of remote controllers.

13. The image display device of claim 12, wherein the controller is configured to output on the display content chosen according by each remote controller of remote controllers paired with the image display device.

14. The image display device of claim 1, wherein the display is a flexible display.

15. The image display device of claim 1, wherein the image display device is a TV.

16. An image display system comprising:
at least one remote controller; and
an image display device including:
a display configured to output content;
a charger configured to charge the remote controller to control the image display device;
a user input interface configured to receive power on/off signals from the remote controller; and
a controller configured to control power use of the user input interface depending on whether the remote controller is being charged by the charger,
wherein, when the remote controller is being charged by the charger and a power to the image display device is off, the controller is configured to turn off a I/R (infrared) standby function of the user input interface for receiving a power-on signal, and
when the remote controller is being charged by the charger and the power to the image display device is on, the controller is configured to turn on at least one sensor for receiving a control signal for controlling the image display device.

17. The image display system according to claim 16, wherein the at least one remote controller is a mobile terminal capable of receiving a text message.

18. The image display system according to claim 16, wherein the image display device is a TV.

19. The image display system of claim 16, wherein, when the remote controller is being charged by the charger and power to the image display device is off, the controller is configured to control the power use of the user input interface to receive the power-on signal.

20. The image display system of claim 16, wherein, when the remote controller is being charged by the charger, the controller is configured to put at least one sensor into an ON state to be capable of receiving a control signal.

* * * * *